Nov. 29, 1938.     E. J. LYNCH     2,138,253
TOOL HOLDER
Filed Feb. 4, 1935
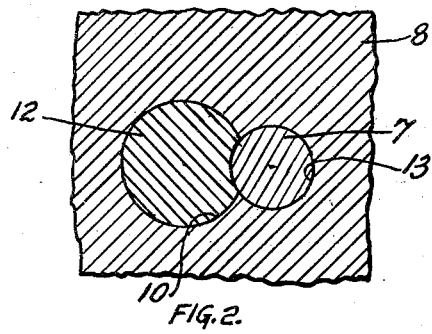
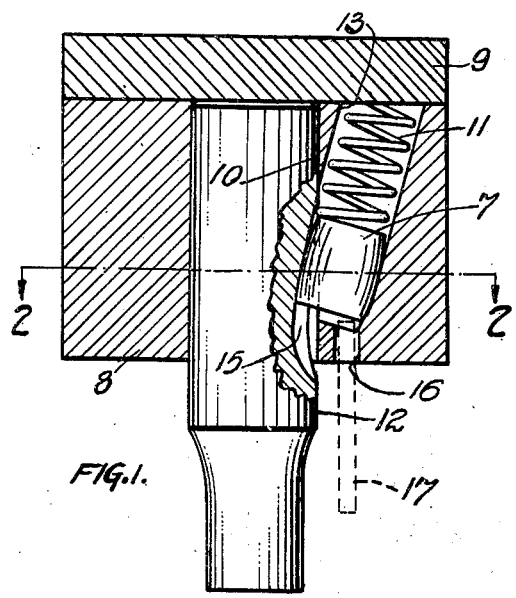
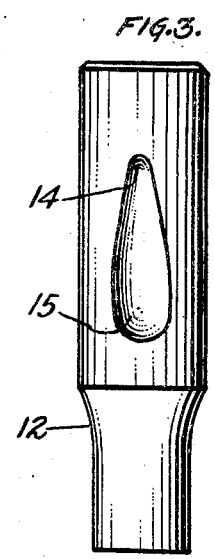
INVENTOR
EDWARD J. LYNCH
BY
ATTORNEY Patented Nov. 29, 1938

2,138,253

UNITED STATES PATENT OFFICE 2,138,253

TOOL HOLDER

Edward J. Lynch, Detroit, Mich.

Application February 4, 1935, Serial No. 4,803

1 Claim. (Cl. 279—29)

This invention relates to tool holders, and particularly to tool holders using a spring-pressed detent to retain a tool in its socket.

An object of the invention is to provide a tool-holding detent engageable with a tool under pressure of a suitable spring, and shaped to undergo a limited rocking movement in contacting a tool, so as to adjust itself to slight inaccuracies in machining the tool, and to slight variations in the position of the tool in its socket.

Another object is to dispose a tool-holding detent in a bore obliquely intersecting a tool-receiving socket, and to so shape said detent as to facilitate its insertion in and removal from said passage.

A further object is to provide a detent movable in a bore acutely inclined to a tool-receiving socket, and adapted to fit into a lateral recess of the tool, and to so shape the detent, recess, and bore, as to afford the detent a considerable bearing surface on the walls of the recess and bore.

With the foregoing and various other objects in view, the invention consists of the combination of parts and structural features hereinafter described, and illustrated in the accompanying drawing, wherein:

Fig. 1 is a fragmentary axial vertical sectional view of the invention as applied to a punch.

Fig. 2 is a fragmentary cross sectional of the same, taken on the line 2—2 of Fig. 1.

Fig. 3 is an elevational view of the punch, particularly showing a recess therein to receive said detent.

In these views, the reference character 8 designates a socket-forming block which is rigidly fastened in a well known manner (not shown) to a backing plate 9. The socket 10 of said block is intersected by a bore 13, extending upwardly from and acutely inclined to said socket, slidably receiving a detent 7 of circular cross section and of slightly elongated form, and having a slight convexity from end to end. Thus the detent is gradually reduced in diameter from its center to its ends, its maximum diameter being such as to afford it a free sliding fit in the bore 13. The detent is urged toward the socket 10 by a spring 11 coiled in the upper portion of the bore 13 and abutting the plate 9, and the punch 12 in said socket is laterally formed with an elongated recess 15, gradually increased in depth from its upper end 14 to its lower portion, said recess in the locking position of the punch, forming a continuation of the bore 13 and registering more or less accurately with such bore. The wall of the recess in its upper portion has approximately the same acute inclination to the punch axis and approximately the same cross-sectional curvature as said bore. Consequently, when the recess 15 is registered with the bore, as illustrated, the detent 7 will project into said recess responsive to the spring 11, and may closely conform at its mid portion to the recess. In order that the detent may further positively engage the recess wall throughout a considerable longitudinal extent thereof, a mid-length portion of the recess wall is arcuately curved correspondingly to the end to end curvature of the detent, whereby that portion of the detent below its medial transverse plane and within the recess may wedgingly engage the recess wall throughout the surface area of such portion.

Also, in order that the detent may bear on a considerable area of the wall of the bore, the latter has its lower portion curved conformingly to the lower portion of the detent, as best appears in Fig. 1.

From the lower end of the bore 13, a relatively reduced passage 16 extends to the bottom face of the block 8 to permit a rod 17 or similar tool to exert an upthrust on the detent to dislodge it from locking position.

Because of its end to end convexity, the detent is adapted for a limited self-adjusting rocking motion to establish it in firm wedging engagement with the punch, compensation being thus made for slight inaccuracies in machining the punch and for any slight vertical yielding of the punch that may be occasioned by the heavy stresses incident to perforating use of the punch, and stripping the work therefrom. As compared to a ball type detent or one of true cylindrical shape, the described detent secures an important advantage in establishing a much larger area of contact between the detent and punch. A ball detent is adapted to contact a tool only along a circular line, and a cylindrical detent only along a straight line. The larger the area of contact between the detent and the tool, the less force need be applied through the rod 17 to dislodge the detent from its locking position. Therefore, a line contact between the detent and tool is preferable to a point contact, and a surface contact is preferable to a line contact.

Conformity of the cross sectional curvature of the detent to that of the recess 15 (see Fig. 2) insures a positive prevention of rotation of the punch in the block 8.

The self-adjusting nature of the described detent eliminates necessity for accurately positioning the recess 15 with reference to the upper end of the punch, and thus permits the latter to be more quickly machined. Also because of the described formation of the detent and recess, the positioning of the bore 13 relative to the socket 10 requires only approximate accuracy, the only requirement for extreme accuracy being information of said socket.

While the invention has been particularly described in its application to a punch, it is obviously suited to retain any tool removably in a socket.

The invention is presented as including all such modifications and changes as properly come within the spirit and scope of the following claim.

What I claim is:

In a tool holder, a member formed with an elongated socket and with a bore intersecting said socket at an acute angle, a detent slidable in said bore, a spring urging the detent toward the socket, and a tool normally retained in the socket by the detent, the tool being laterally formed with a recess for seating the detent, the detent having a convex, end-to-end surface curvature, and the wall of said recess and an opposed portion of the bore wall being curved conformingly to the lower half of the detent, whereby the detent may wedgingly seat against predetermined surface areas of the recess and bore walls.

EDWARD J. LYNCH.